(12) United States Patent
Bello et al.

(10) Patent No.: US 8,082,388 B2
(45) Date of Patent: Dec. 20, 2011

(54) OPTIMIZING OPERATIONAL REQUESTS OF LOGICAL VOLUMES

(75) Inventors: Keith A. Bello, Oro Valley, AZ (US); Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 12/057,128

(22) Filed: Mar. 27, 2008

(65) Prior Publication Data
US 2009/0248974 A1 Oct. 1, 2009

(51) Int. Cl.
*G06F 12/00* (2006.01)
(52) U.S. Cl. ............... 711/111; 711/202; 711/E12.001
(58) Field of Classification Search .................. None
See application file for complete search history.

(56) References Cited

U.S. PATENT DOCUMENTS

| | | | |
|---|---|---|---|
| 6,172,833 | B1 | 1/2001 | Fry et al. |
| 6,349,356 | B2 | 2/2002 | Basham et al. |
| 6,763,427 | B1 | 7/2004 | Doi et al. |
| 6,967,802 | B1 * | 11/2005 | Bailey .................... 360/72.1 |
| 2002/0156968 | A1 | 10/2002 | Haustein |
| 2006/0149898 | A1 | 7/2006 | Bello et al. |

OTHER PUBLICATIONS

Sandsta, Olav et al., "Low-Cost Access Time Model for Serpentine Tape Drives," 1999, pp. 116-127.
Sandsta, Olav et al., "Improving the Access Time Performance of Serpentine Tape Drive," pp. 543-531.
Sandsta, Olav et al., "Random I/O Performance of a Tanberg MLR1 Tamp Drive", pp. 91-102.

* cited by examiner

*Primary Examiner* — Denise Tran
(74) *Attorney, Agent, or Firm* — Hamilton & Terrile, LLP; Stephen A. Terrile

(57) ABSTRACT

A method, system, apparatus and computer program product for determining an optimal file operational time in a data storage system for use with a tape media storing data in a serpentine pattern on tape media is provided. The operational time is optimized based on a "sequence on tape" algorithm, a "minimum reversal of direction on tape" algorithm, or a "minimum delay to next data" algorithm. A model is used to determine the predicted performance of each of the algorithms, and the algorithm that provides the minimum overall operational time is chosen and applied for carrying out an operational process on the tape media.

8 Claims, 5 Drawing Sheets

OPTIMIZING OPERATIONAL REQUESTS OF LOGICAL VOLUMES

BACKGROUND OF THE INVENTION

1. Field of the Invention

This invention relates to operations on logical volumes in a virtual tape server and more particularly to optimizing operational requests on logical volumes using algorithms.

2. Description of the Related Art

Data Processing systems typically require large amounts of data storage capacity. Portions of the data storage capacity may be needed quickly and may be stored in memory and hard disk drives. Other portions of the data storage capacity may not be required immediately.

As an example, data not immediately required may comprise data that is infrequently accessed. Storage of such data may be in the form of logical volumes of data stored on removable re-writable physical media volumes, such as magnetic tape or optical disk, and the physical media volumes may be written and/or read by means of a data storage drive.

If large amounts of data are to be stored and then accessed on occasion, virtual tape servers (VTS) backed by automated data storage libraries are often employed. Such libraries provide efficient access to large quantities of data stored on physical media volumes which are stored in storage shelves, accessed by one or more users and delivered to data storage drives in the library.

A request by a host data processing system to create or modify a logical volume is issued to a VTS. If the request requires access to a physical media volume that contains the requested logical volume, the VTS instructs its attached library to access the physical media volume from the storage shelf and mount the physical media volume at a desired data storage drive. The logical volume is read to cache storage, which may comprise hard disk drives or other high-speed storage, so that it may be immediately accessed and provided to the host system.

If the request is for a logical volume that is already in cache, or is for a logical volume that will be completely rewritten, a physical media volume access is not required. The host system then reads from or writes to the logical volume in the cache of the VTS. When the logical volume is closed, it remains in cache storage so that it can be immediately re-accessed.

The cache storage is typically limited in capacity, requiring that the updated logical volumes be migrated back in storage so as to free space in the cache storage. Typically a least recently used (LRU) algorithm is employed to migrate logical volumes out of cache storage back to physical media.

Recalling and copying a migrated logical volume requires that the physical media volume containing the migrated logical volume be mounted on a data storage drive. This allows the logical volume to be recalled into cache storage, re-accessed and copied.

Volume mapping is used to create a correlation between the physical capacity of a storage cartridge (stacked volume or physical volume) and the data storage unit size (virtual volumes or logical volumes) of a file or block that is stored on the cartridge. Given the available data storage capacity of a disk, such mapping allows multiple logical volumes to be stored on a single physical volume, hence providing an efficient use of the available storage media. A virtual tape server (VTS) is one device capable of creating and maintaining such mapping among physical volumes and logical volumes.

A typical VTS has a small number of physical drives that can be used for recalling virtual volumes. The VTS has a greater number of virtual drives or devices that provide access to the virtual volumes.

A VTS fills a physical tape by stacking multiple logical volumes. Over time, some of these logical volumes expire and the tape contains less active data. Eventually the physical tape is reclaimed—a process which reads active data from the tape. This active data is scattered on the physical tape requiring that each logical volume be located and read from the tape. At the conclusion of this reclamation process the tape is normally rewound.

Such reclamation is a time consuming process. Typically, the tape is written in a serpentine pattern with multiple passes. Although the location of each logical volume being reclaimed is known, it is a specific location on the tape assuming the serpentine pattern was unwound.

The motion required to read the logical volumes during the reclamation process can be modeled. Due to the time it takes a physical drive to reverse directions, switch from track to track and the effect of high speed locates, the model is non-linear. As such it becomes difficult to predict a best sequence to reduce the time to access logical volumes. In theory the most efficient method can be determined by exhaustively analyzing different sequences of logical volume accesses. In practice this is not feasible as the number of combinations to analyze is impractical.

It would be desirable to use knowledge of the actual location of each logical volume on a tape based on its physical location, along with knowledge of the serpentine pattern, to increase the efficiency and reduce the overall operational time of operational requests. Such operational requests include the recall and reclamation operations of logical volumes on a virtual tape server.

SUMMARY OF THE INVENTION

The present invention provides a method, system, apparatus and computer program product for optimizing operational requests, including recall and reclamation requests, on logical volumes in a virtual tape server that overcome the above-discussed shortcomings.

A method for retrieving one or more blocks of data from tape media includes receiving a request to retrieve multiple groups of at least one block of data. The method also includes the step of retrieving a device block map from a tape media which indicates the positions of the groups of the blocks of data on the tape media and storing the device block map in a memory location. An image of the physical layout of the requested groups is generated from the device block map in memory. The optimal order of retrieval of the requested groups of data based on the physical layout of the group in the image that minimizes the operational time of retrieving the requested groups of data is determined. The requested groups of data are retrieved using the determined optimal order.

An apparatus for operating on logical volumes includes a receiving module configured to receive at least two operational requests, each operational request being directed to a logical volume stored in mountable media. The apparatus includes a storage module configured to store each operational request for processing. An optimizer module is included and configured to compare the results of each operational request, determine an operational request that minimizes operational time of carrying out the operational request and apply an optimized operational request to the logical volume.

An embodiment of the system to recall and reclaim logical volumes of the present invention includes at least one drive unit configured to receive mountable media containing at least one logical volume. The system includes a cache configured to store a logical volume received from the mountable media and memory containing modules for execution on a processor. The modules include a receiving module configured to receive a plurality of operational requests, each operational request being directed to a logical volume stored on the mountable media and a storage module configured to place each operational request in storage for processing. An optimizer module is included and configured to apply at least one optimization rule to at least one logical volume to minimize the time of retrieval of one or more operational requests.

The computer program product of the present invention includes a computer usable medium having computer usable program code for retrieving one or more blocks of data from a tape media and computer usable program code for receiving a request to retrieve multiple groups of data blocks. The computer program product includes computer usable program code for retrieving a device block map from a tape media indicating positions of the groups of data on the tape media and storing the device block map in a memory location. Computer usable program code for generating from the device block map in memory an image of a physical layout of the requested groups of data on the tape media is included. The computer program product includes computer usable program code for determining the optimal order to retrieve the requested groups of data based on the physical layout as indicated in the image in a manner that minimizes an operational time of retrieving the requested groups of at least one block of data. Computer usable program code is included for retrieving the requested groups of data from the tape media using the determined optimal order.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Accordingly, discussion of the features and advantages throughout this specification may, but does not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Features and advantages of the present invention will become more fully apparent from the following description and appended claims.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
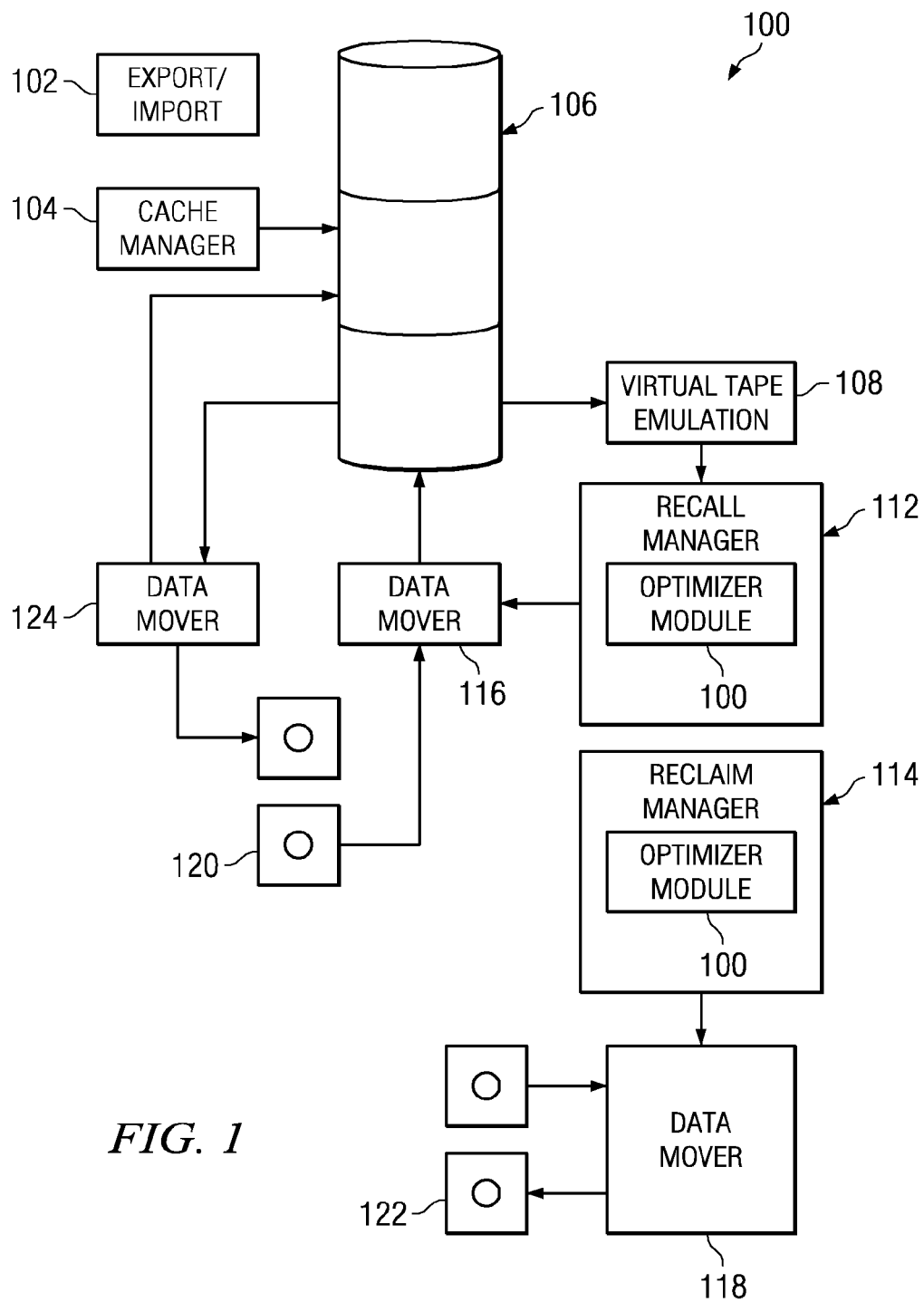
FIG. 1 is a schematic block diagram illustrating one embodiment of a virtual tape system and method according to the present invention.

FIG. 1 illustrates a schematic block diagram of one embodiment of a representative virtual tape system 100 for operating on logical volumes, in accordance with the present invention. The system 100 includes a processor controlled automated import/export module 102 which includes a receiving module and an import module (not show) for receiving and transporting operational requests and data in virtual tape system 100. Import/export module 102 communicates with a cache manager 104 which communicates with at least one direct access storage device (DASD) cache 106 all controlled by a processor (not shown). The DASD cache 106 temporarily stores data received through import/export module 102 and cache manager 104 and communicates with virtual or logical volumes in the form of files, and may thus be referred to as a "cache." According to one example, the DASD cache 106 takes the form of one or more hard disk drives which may be arranged in a redundant array of independent drives (RAID configuration), such as RAID 5. DASD cache 106 also communicates with virtual tape server emulation module 108 (VTS). Virtual tape server emulation module 108 includes a group of virtual tape drives for storing, manipulating and comparing operational requests and data processed by the present invention. Virtual tape server emulation module 108 also processes control commands from import/export module 102 and cache manager 104.

As shown in FIG. 1, virtual tape server emulation module 108 may generate and store the required images and maps while communicating through an optimizer module 110 which includes a recall manager module 112 and reclaim manager module 114. It is through optimizer module 110, recall manager module 112 and reclaim manager module 114 that the algorithms included in the steps of the present invention are applied to determine the optimum retrieval path and minimum operational time for carrying out one or more operational steps including recall and reclamation operations. To carry out application of the minimum operational time algorithm, optimizer module 110 communicates with data mover modules 116 and 118 each of which communicates with tape drives 120 and 122. Data mover module 124 is included and is capable of communicating directly between DASD cache 106 and tape drive 120. This communication path provides for updating of at least one tape unit with information received through import/export module 102 and cache manager 104, and allows the virtual tape system 100 to apply a further optimized algorithm to identify the optimal retrieval path, which may be repeated at any point in the data read/write process, as required by the present invention. It may be appreciated by those of skill in the art that data mover modules 116, 118 and 124 and tape drive 120 and 122 may include multiple data mover modules and multiple tape drives for use in a variety of data and virtual tape systems and are not limited to the number illustrated in FIG. 1.

Figure 2:
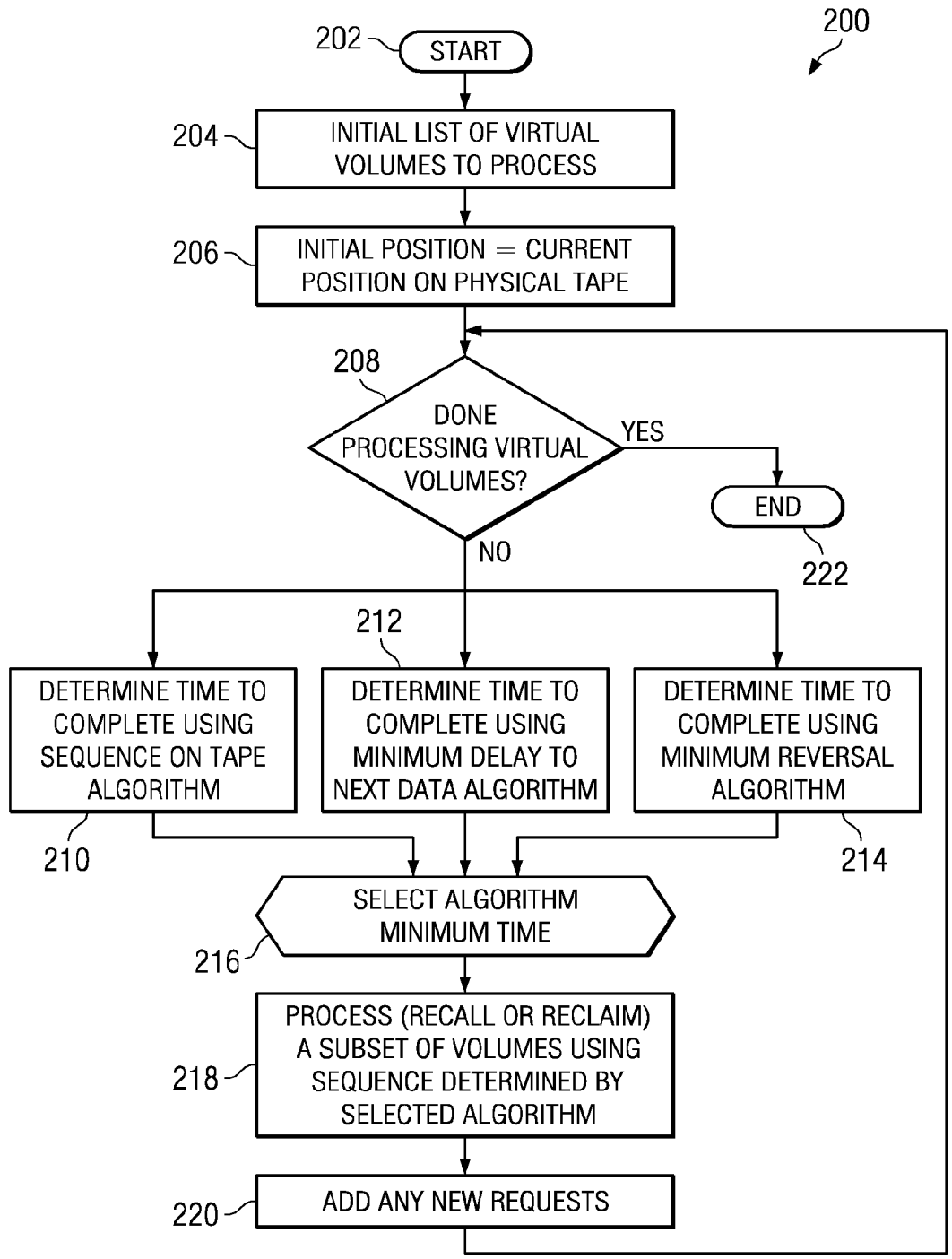
FIG. 2 is a schematic flow chart diagram illustrating one embodiment of a method for optimizing operational requests in a logical volume of the present invention.

FIG. 2 illustrates a schematic flow chart diagram illustrating a method for optimizing operational requests and retrieval paths for logical volumes of the present invention as shown at 200. The optimization process begins at step 202 and receives an initial list of virtual volumes including multiple groups of one or more data blocks necessary to process an operational request at step 204. The initial position of the physical tape drive 120 is identified in step 206. If the process is not complete as shown in step 208 then a map of the virtual drive is retrieved, stored and used to generate an image of the physical layout of the groups of data blocks. The optimal retrieval order of the data block groups is determined by calculating the shortest retrieval time using one or more retrieval paths or algorithms. Each of the retrieval paths or algorithms comprises as ordered sequence of the requested data block groups and identifies the manner in which the tape media is to be traversed to accomplish the optimal retrieval order sequence. One such retrieval path or algorithm is the sequence on tape (first in/first out) algorithm where the next data record in sequence is located until the request is complete at step 210. As shown at step 212, the time to complete the operational request is calculated using the minimum delay to the next data record algorithm. At step 214 the time to complete the request is calculated using the minimum reversal (the minimum tape direction reversal sequence) algorithm. After each of these times is calculated and stored, the times are compared and the algorithm with the lowest completion time for the operational request is chosen at step 216. It may be appreciated that the sequence or order of application of each of the operational algorithms is not critical to the processing performed by the present invention.

The algorithm that has the lowest minimum time to complete the operational request is applied in step 218 and is used to process the subset of volumes chosen in step 204 utilizing the optimal retrieval path. This method of determining the shortest processing time delivers the quickest completion time for the operational request made by the system in step 204. At step 220 it is determined if there are any additional or new requests made by the system and again it is determined at step 208 if the system has completed processing the virtual volumes. If the processing is not yet complete and there are new or additional requests, the process again moves through steps 210, 212, 214, 216, 218 and 220 to determine the which algorithm should be applied to obtain the quickest processing of the operational requests made to data on the virtual volumes. If there are no new requests for processing at step 220 then processing of the virtual volumes is completed in step 208 and the process ends at step 220.

Optimization algorithms are applied to the image at steps 210, 212 and 214 to achieve the fastest possible processing time. Improving the efficiency of operational requests including reclamation and recall in a serpentine tape drive as disclosed herein are examples of the process carried out by optimizer module 110 in FIG. 1 as set forth in steps 210, 212 and 214 in FIG. 2 and as set forth above. Such optimization has been determined to be carried out utilizing one or more of the retrieval paths based on the image of the layout of the requested data groups in memory. One algorithm is known as sequence on tape which determines a first in/first out sequence by moving the tape media from a current location to a secondary location closest to the current location in a preferred direction and on a preferred track of said tape media independent of track information. A second algorithm processes data placed on tape media utilizing a minimum reversal of direction of the tape media tape which moves the tape media from a current location to a secondary location closest to the current location in a preferred direction independent of track information of the tape media. Another algorithm processes data utilizing a minimum time delay to the next data sequence or element which moves the tape media from a current location to a secondary location closest to the current location independent of a direction of movement of the tape media.

A computer program product is also presented that performs one or more operations to recall logical volumes from mountable media. In one embodiment, the operations include performing the method steps outlined above in FIG. 2. In another embodiment of the present invention, the default algorithm of sequence on tape is used to provide the most efficient processing of data. In further embodiment of the present invention, to improve the processing efficiency, a second algorithm is compared to the sequence on tape processing. The second algorithm is the minimum reversal of direction of the tape media. This algorithm will move down the tape in a given direction and select the closest logical volume that can be accessed in that direction from the end of the last volume read (or initially the beginning of the tape) without having to stop. In determining the efficiency of this algorithm, it is recognized that time is required to move the tape head if a different parallel track is chosen. When a pass is completed in that direction, the tape will move to the first logical volume that can be read in the opposite direction, that first volume being the one closest to the "beginning" of a scan in the new direction. The intent of this algorithm is to take long passes down the tape and minimize reversals of direction thus improving processing efficiency.

A third algorithm is also used to compare the results of the first two algorithms to further improve processing efficiency. The third algorithm is the minimum delay to next data element or closest logical volume (CLVOL) algorithm. From a given point in tape—the end of the last volume read (or initially the beginning of the tape)—the closest logical volume is selected. The closest logical volume being the volume that takes the least time to locate. Given the high speed locate functionality of the physical drive, this volume could theoretically be further away physically than other volumes. This algorithm would tend to have increased tape reversals, but could be more efficient on clusters of data.

In operation, each of these algorithms is fast, since they only evaluate which volume should be next from a given position. Using the model, the predicted performance of each of the sequences is calculated, including a final move to the beginning of the tape as the tape will be unloaded as part of this operation. Once the predicted performance of all the volumes on the tape is determined, the best algorithm (based on minimum overall time) is chosen and applied to the operational process.

The present invention provides an efficient and simple method to determine an improved sequence of accessing logical volumes prior to reclaiming a physical volume. Specifically, the optimization process includes developing a model for physical tape operations, developing algorithms as described above that suggest an access pattern and modeling those patterns then selecting the best access pattern which minimizes the processing time.

As discussed above, the modules for receiving a plurality of operational requests, placing each request in a queue for processing, reordering the queue in accordance with at least one optimization rule, and/or retrieving requested groups of data using a determined optimal order, could be implemented by hardware, firmware, software, or the like, or any combination thereof. These and other means for receiving, queuing and optimizing operational requests could be implemented to practice the teachings of this invention.

It will be appreciated that additional optimization rules could be applied to the processing of recall requests which could reorder the recall requests in the optimizer module 110. These and other such optimization rules could increase efficiency, practicality, or utility and fall within the scope of this invention. It will further be appreciated that these and other optimization rules could be applied singly or in combination to practice the teachings of this invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the invention. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
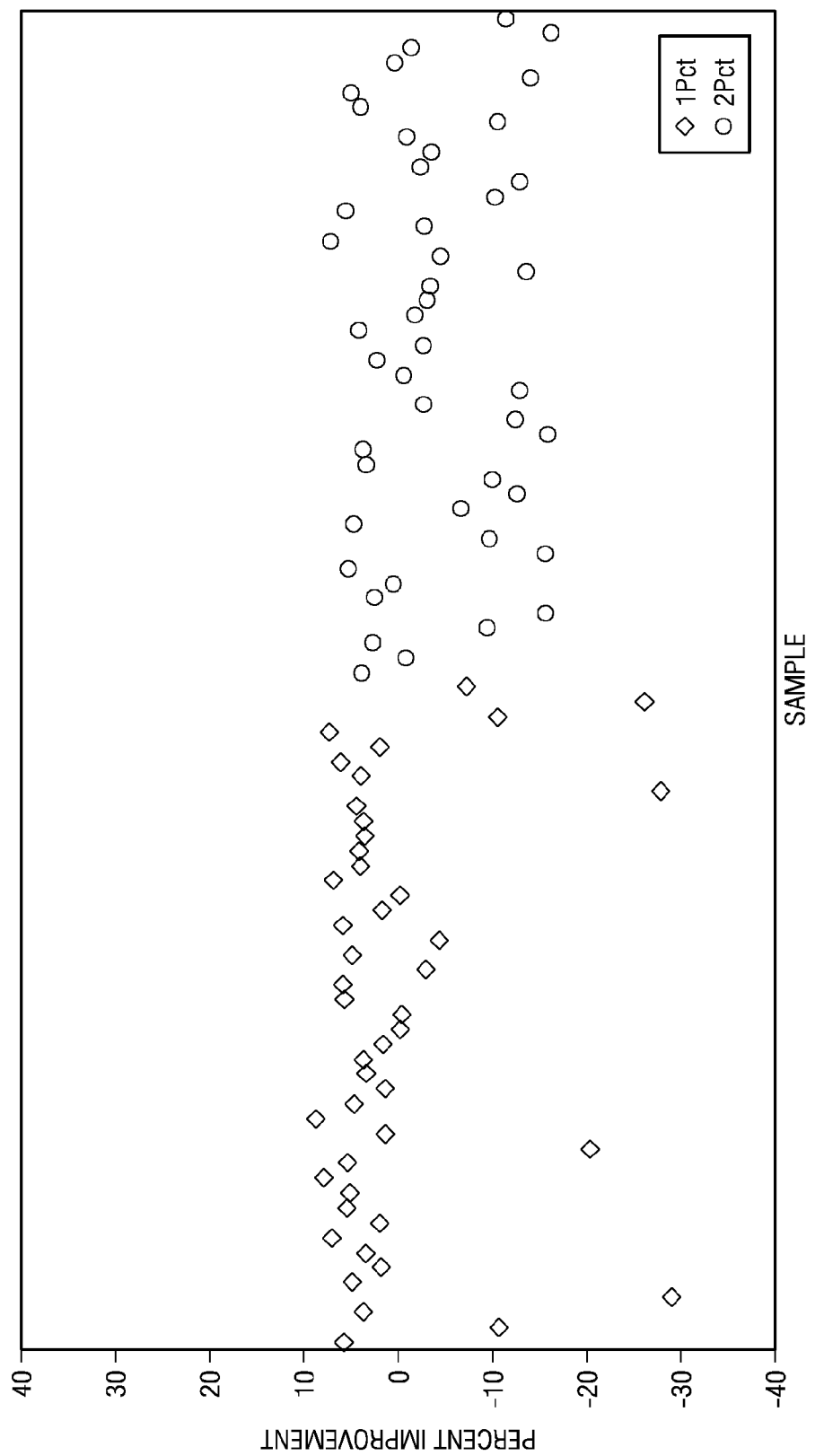
FIG. 3 is a graph showing the improvement in reduced processing time of the present invention.
Figure 4:
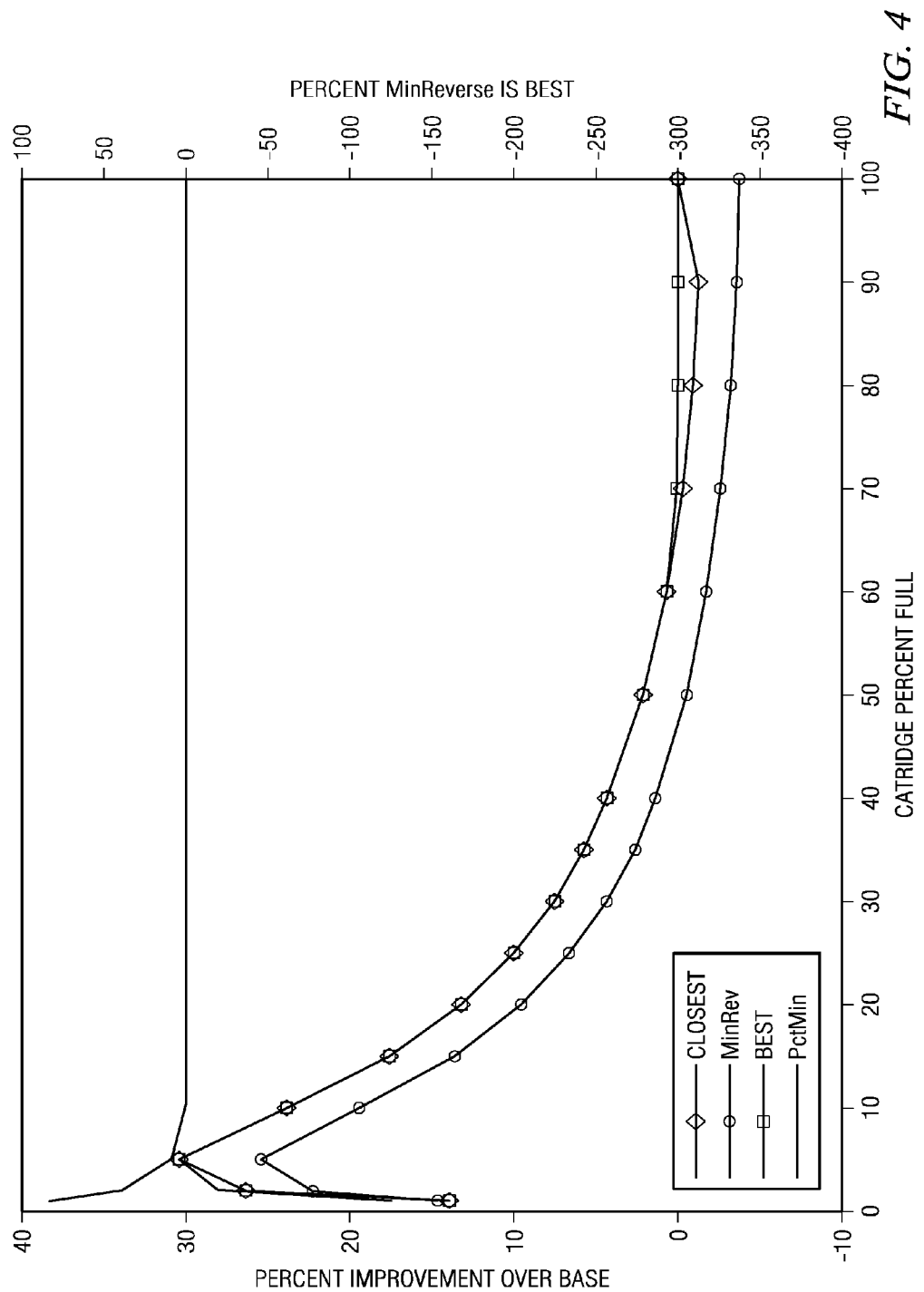
FIG. 4 is a performance graph showing the relative reduction in processing time applying various algorithms of the present invention.
Figure 5:
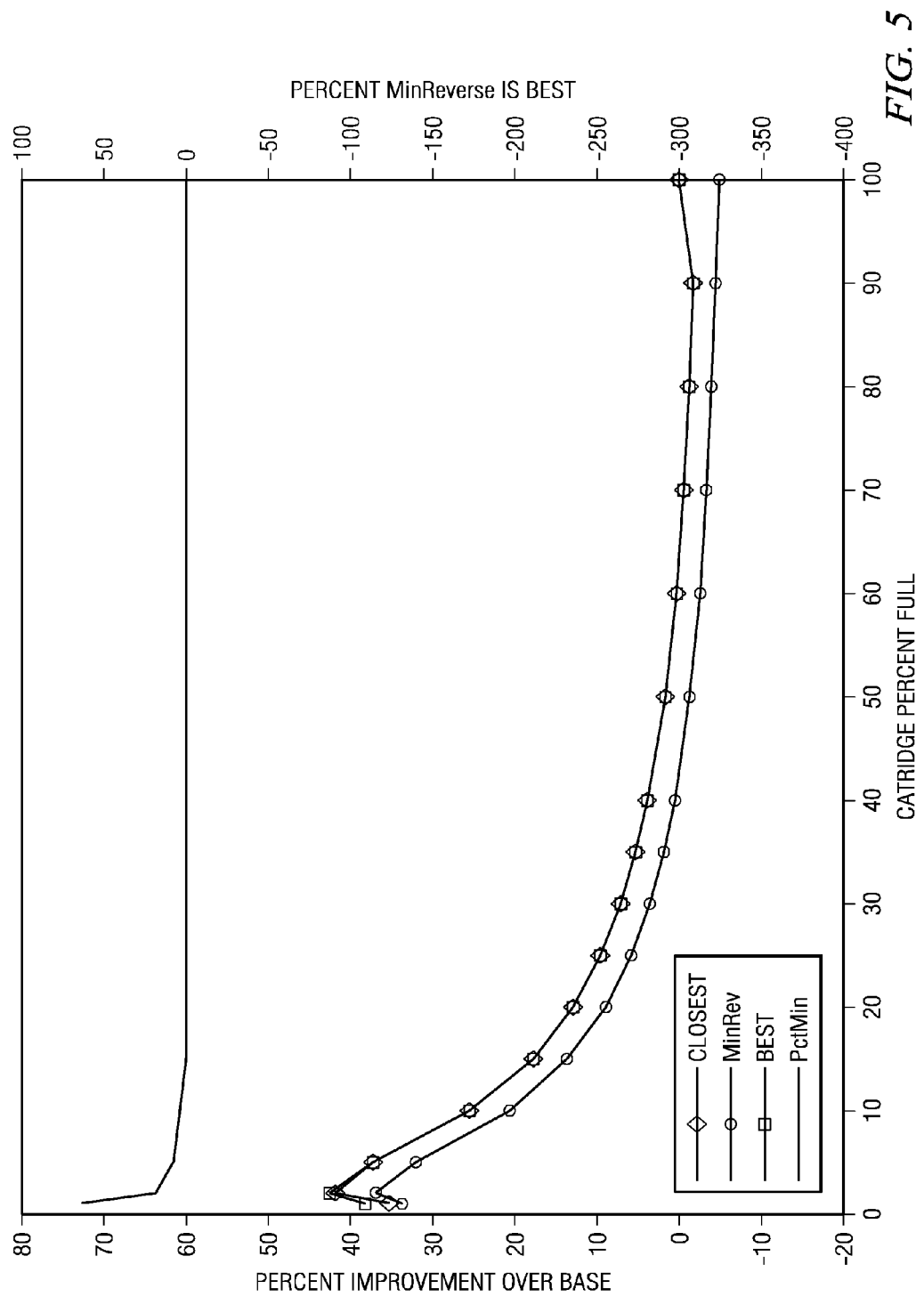
FIG. 5 is a second performance graph showing the relative reduction in processing time applying various algorithms of the present invention.

The results of application of the optimization algorithms of the present invention are shown in FIGS. 3, 4 and 5. Specifically, the graph of FIG. 3 compares the results of application of the first in/first out (base) algorithm to each of the minimum reversal and closest (or next sequence on tape) algorithms. The scattering of the results around zero indicates that one or the other is better for any given sample. The varying results at 1 percent and 2 percent active data shows that neither technique is always better at a given percentage active data. Therefore selecting the most efficient algorithm from a set of modeled results is the most appropriate technique.

It should be noted that the first in/first out (in logical order) is the most efficient solution at both 0% active data and at 100% active data. On a virtual tape server, reclaim thresholds of 10% active data are typically used, but any value can be used, although such threshold values are typically below 50%.

Referring to FIGS. 4 and 5, each algorithm was processed for various percent active data tapes each with a different random pattern. The averages of these patterns are shown. The first set is for 800 MB volumes (full volumes on a VTS). The average of the improvement is higher in some cases as the method selects the individual best algorithm and will therefore end up with a higher average value. This plot is in percentage improvement in reclamation time using the closest and the minimum reversal algorithms versus the sequential or first in/first out (base) algorithm.

As shown in FIG. 4, up to 30% improvement over the sequential or first in/first out algorithm can be achieve using the best of the closest and minimum reversal algorithms. In addition, it shows that the minimum reversal algorithm is best at low percentages and the closest algorithm is better in general. When using random volumes (100-800 MB), the improvements obtained through the use of the present invention are further enhanced.

As may be appreciated, it is not feasible to calculate the absolute best case sequence in all cases as the value of the return begins to diminish based on the time to process the results. Such results were calculated for 1% active and 2% active as shown in the graph in FIG. 3. At the low percent active distributions, the time to process the results and select the best of the algorithms is better than any single solution, and is close to the absolute best sequence.

Many of the functional units described in this specification have been labeled as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer program product may take any form capable of generating a signal, causing a signal to be generated, or causing execution of a program of machine-readable instructions on a digital processing apparatus. A computer program product may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the forgoing description, numerous specific details are provided, such as examples of programming, software modules, user selections, network transactions, database queries, database structures, hardware modules, hardware circuits, hardware chips, etc., to provide a thorough understanding of embodiments of the invention. One skilled in the art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for retrieving blocks of data from a tape media, the method comprising:
   receiving a request to retrieve multiple groups of at least one block of data;
   retrieving a device block map from a tape media indicating positions of the groups of at least one block of data on the tape media and storing said device block map in a memory location;
   generating from the device block map in memory an image of a physical layout of the requested groups of at least one block of data on the tape media;
   determining an optimal order to retrieve the requested groups of data based on the physical layout of the requested groups indicated in the image in a manner that minimizes an operational time of retrieving the requested groups of at least one block of data; and
   retrieving the requested groups of at least one block of data from the tape media using the determined optimal order; and wherein
   the determining the optimal order further comprises:
      determining a plurality of retrieval paths based on the image of the layout of the requested groups of the at least one block of data in memory, wherein each of the retrieval paths comprises an ordered sequence of the requested groups of the at least one block of data and the manner in which the tape media is to be traversed to accomplish the retrieval of the ordered sequence;
      determining a sum of operational times for each of the retrieval paths;
      selecting an optimal one of the retrieval paths based on the lowest sum of the operational times; and
      retrieving the blocks of data from the tape media using the optimal retrieval path.

2. The method of claim 1, wherein determining the plurality of retrieval paths based on the image of the layout of the requested groups of the at least one block of data in memory includes determining a first in/first out sequence which moves the tape media from a current location to a secondary location closest to the current location in a preferred direction and on a preferred track of said tape media.

3. The method of claim 1, wherein determining the plurality of retrieval paths based on the image of the layout of the requested groups of the at least one block of data in memory includes determining a minimum tape direction reversal sequence which moves the tape media from a current location to a secondary location closest to the current location in a preferred direction independent of track information of the tape media.

4. The method of claim 1, wherein determining the plurality of retrieval paths based on the image of the layout of the requested groups of the at least one block of data in memory includes determining a minimum time delay to next data sequence which moves the tape media from a current location to a secondary location closest to the current location independent of a direction of movement of the tape media.

5. The method of claim 1, wherein the determined optimal order comprises a minimum time of retrieval of the requested groups of at least one block of data from the tape media and said optimal order is determined after a first retrieval of at least one block of data.

6. The method of claim 5, wherein said optimal order is determined after a first retrieval of at least one block of data and said optimal order determination is repeated after retrieval of each at least one block of data.

7. A computer program product comprising a non-transitory computer usable medium having computer usable program code for retrieving one or more blocks of data from a tape media, said computer program product including:
   computer usable program code for receiving a request to retrieve multiple groups of at least one block of data;
   computer usable program code for retrieving a device block map from a tape media indicating positions of the groups of at least one block of data on the tape media and storing said device block map in a memory location;
   computer usable program code for generating from the device block map in memory an image of a physical layout of the requested groups of at least one block of data on the tape media;
   computer usable program code for determining an optimal order to retrieve the requested groups of data based on the physical layout of the requested groups indicated in the image in a manner that minimizes an operational time of retrieving the requested groups of at least one block of data; and
   computer usable program code for retrieving the requested groups of at least one block of data from the tape media using the determined optimal order and wherein
   the computer usable program code determining for an optimal order further includes:
      computer usable program code for determining a plurality of retrieval paths based on the image of the layout of the requested groups of the at least one block of data in memory, wherein a beginning and an end location of at least two of the groups are discontinuous and each of the retrieval paths comprises an ordered sequence of the requested groups of the at least one block of data and determining the manner in which the tape media is to be traversed to accomplish the retrieval of the ordered sequence;
      computer usable program code for determining a sum of times for each of the retrieval paths;
      computer usable program code for selecting an optimal one of the retrieval paths based on the lowest determined sum of times; and
      computer usable program code for retrieving the blocks of data from the tape media using the optimal retrieval path.

8. The computer program product of claim 7, wherein the computer usable program code for determining the plurality of retrieval paths based on the image of the layout of the requested groups of the at least one block of data in memory includes:
   computer usable program code for determining a first in/first out retrieval path which moves the tape media from a current location to a secondary location closest to the current location in a preferred direction and on a preferred track of said tape media;
   computer usable program code for determining a minimum tape direction reversal retrieval path which moves the tape media from a current location to a secondary location closest to the current location in a preferred direction independent of track information of the tape media; and computer usable program code for determining a minimum time delay to next data retrieval path which moves the tape media from a current location to a secondary location closest to the current location independent of a direction of movement of the tape media.

* * * * *